United States Patent
Bernier

(10) Patent No.: US 9,262,475 B2
(45) Date of Patent: Feb. 16, 2016

(54) SYSTEMS AND METHODS FOR MATCHING RECORDS USING GEOGRAPHIC PROXIMITY

(71) Applicant: Melissa Data Corp., Rancho Santa Margarita, CA (US)

(72) Inventor: Marc Bernier, Scituate, MA (US)

(73) Assignee: Melissa Data Corp., Rancho Santa Margarita, CA (US)

(*) Notice: Subject to any disclaimer, the term of this patent is extended or adjusted under 35 U.S.C. 154(b) by 178 days.

(21) Appl. No.: 13/916,384

(22) Filed: Jun. 12, 2013

(65) Prior Publication Data

US 2013/0332447 A1    Dec. 12, 2013

Related U.S. Application Data

(60) Provisional application No. 61/658,498, filed on Jun. 12, 2012.

(51) Int. Cl.
*G06F 17/30*     (2006.01)

(52) U.S. Cl.
CPC .... *G06F 17/30442* (2013.01); *G06F 17/30241* (2013.01)

(58) Field of Classification Search
None
See application file for complete search history.

(56) References Cited

U.S. PATENT DOCUMENTS

| 6,374,241 | B1 | 4/2002 | Lamburt et al. |
| 7,912,842 | B1 * | 3/2011 | Bayliss ........................ 707/749 |
| 8,639,616 | B1 * | 1/2014 | Rolenaitis et al. ............. 705/38 |
| 2005/0273452 | A1 | 12/2005 | Molloy et al. |
| 2009/0313463 | A1 * | 12/2009 | Pang et al. .................... 713/150 |
| 2009/0319515 | A1 * | 12/2009 | Minton et al. .................... 707/5 |
| 2010/0023515 | A1 * | 1/2010 | Marx ................................ 707/6 |
| 2011/0191353 | A1 | 8/2011 | L'Heureux et al. |
| 2011/0213583 | A1 * | 9/2011 | Mao et al. ..................... 702/150 |
| 2012/0059853 | A1 | 3/2012 | Jagota |
| 2012/0278263 | A1 * | 11/2012 | Borthwick et al. ............. 706/12 |

FOREIGN PATENT DOCUMENTS

| WO | 00/34897 | 6/2000 |
| WO | 2009/132263 | 10/2009 |
| WO | 2011/094695 | 8/2011 |

* cited by examiner

*Primary Examiner* — Khanh Pham
(74) *Attorney, Agent, or Firm* — Fish & Tsang LLP

(57) ABSTRACT

Contact objects in one or more databases can be matched using various systems and methods to determine geographical proximity between the objects. Location attributes associated with first and second objects can be compared to determine a distance between the locations associated with the objects. The objects can then be grouped if the distance is less than a threshold distance.

14 Claims, 5 Drawing Sheets

SYSTEMS AND METHODS FOR MATCHING RECORDS USING GEOGRAPHIC PROXIMITY

This application claims the benefit of U.S. provisional application No. 61/658,498, filed on Jun. 12, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is data processing, and specifically data processing systems and methods for matching records.

BACKGROUND

It is a common goal for data processors to remove duplicate records from a database of records (e.g., customers' contact information), as duplicate records provide inaccurate information, and can result in wasted mailing costs and customer dissatisfaction.

In the past, duplicate records were uncovered using a "brute force" algorithm, where each record is compared to every other record in a database. For example, a database having ten records would require forty-five comparisons. Adding an additional record to the database would require ten additional comparisons, and adding another record would require eleven additional comparisons, and so forth. Although comparisons can be done very quickly with today's computers, the sheer number of comparisons required even for small databases (e.g., one million records) can easily exceed practical time spans. For example, in the case of one million records, one trillion comparisons would be required.

To reduce the amount of processing time required, it is known to first cluster records that share a certain attribute. For example, a database of records could be clustered by the first digit of each record's zip code, creating ten clusters. Each record in the cluster is then compared to every other record in the cluster using a "brute force" algorithm. Although this process reduces processing time, the process is incomplete because records in one cluster are not compared with records in other clusters. Thus, if a record in cluster A were to match another record in cluster B, the match would not be found.

Various other processes of detecting duplicate records are described in the art. See, e.g., U.S. Pat. No. 6,374,241 to Lamburt et al.; U.S. pat. publ. no. 2005/0273452 to Molloy, et al. (publ. December 2005); U.S. pat. Publ. no 2011/0191353 (publ. March 2011); U.S. pat. publ. no. 2012/0059853 (publ. March 2012); WIPO publ. no. 00/34897 to Bloodhound Software, Inc. (publ. June 2000); and WIPO publ. no. 2009/132263 to Lexis-Nexis Risk & Information Analytics Group, Inc. (publ. October 2009). However, all the processes known to Applicants are also incomplete and fail to appreciate that geographical proximity between records can be used to determine whether the records are duplicates.

Thus, there is still a need for efficient systems and methods that match records using geographical proximity.

SUMMARY OF THE INVENTION

The inventive subject matter provides apparatus, systems and methods in which one can match records in one or more contact databases using geographical proximity. The one or more contact databases can collectively include a plurality of contact objects, each of which has an associated location attribute.

To determine whether duplicates exist among the plurality of contact objects, a location attribute of a first contact object can be compared to a location attribute of a second contact object to determine a distance between the first and second contact objects using a matching engine. If the distance is less than a threshold distance, a group identification number can be associated with the first and second contact objects. Any additional records that are found to match the records associated with that group identification number can also be associated with that group identification number.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based data processing system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide many advantageous technical effects including increasing the efficiency of data processing of one or more database to identify matches among the records in the one or more databases. By using geographical proximity, records can be matched that have non-identical fields, and that might otherwise have been missed by conventional processes.

Figure 1:
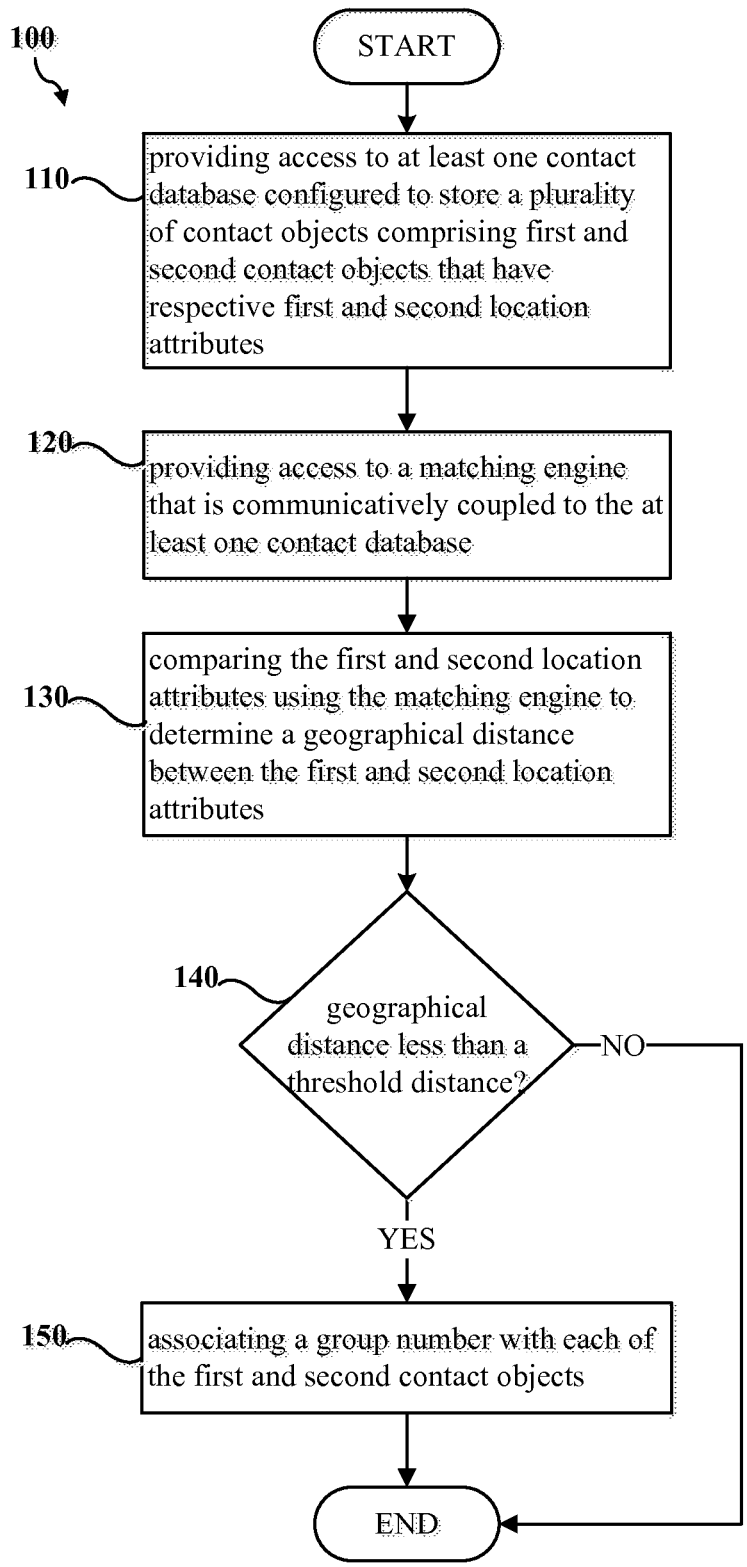
FIG. 1 is a flowchart illustrating one embodiment of a method for matching records in a database.

In FIG. 1, an embodiment of a method 100 for matching contact objects in a database is shown using geographical proximity. Method 100 preferably includes step 110 of providing access to at least one contact database configured to store a plurality of contact objects. Each of the contact objects can have an associated location attribute. Although the location attribute can include postal address information such as an address, a city, a state, and a zip code including zip+4, it is preferred that the location attribute comprises geographical coordinates such as latitude and longitude. It is contemplated that such information can be user-provided or derived from the contact object using software or some other source (e.g., a geo-location device or a geo-point table). Exemplary software includes GeoCoder Object™ sold by Melissa DATA™, although any commercially suitable software could be used.

The method 100 can further include step 120 of providing access to a matching engine that is communicatively coupled to the at least one contact database. The matching engine can advantageously be used to match contact objects within or among one or more databases and thereby uncover duplicate objects. In its simplest form, the plurality of records can be matched by comparing each record in the one or more databases with every other record in the one or more databases. Although there are optimizations to this process that can be applied, the following discussion is based on this simplification.

Each of the contact objects can have various attributes including, for example, a last name, a first name, one or more addresses (e.g., city/state/zip and/or geographical coordinates), a phone number, an email address, contact preferences, and so forth. Because of the breadth of data often associated with each record, it is common practice to use only a subset of a database's fields in the matching process. Common field types used for matching include, for example, a first name, a last name, a street address, a phone number, a company name, and so forth.

A user can specify the conditions of determining whether records match by defining a set of matching rules, such as by using a matching interface. For example, using the matching interface, a user might define the matching rules to include the parameters "first name", "last name", and "located within 10 miles (16.09 kilometers)". In another example, the user might define the matching rules to include the parameters "phone number", "last name" and "located within 15 miles (24.14 kilometers)". In still another example, the user might instead define the matching rules to include the parameters "company name", "city" and "located within 5 miles (8.047 kilometers)". It is contemplated that the matching interface could utilize drop-down menus or text-based inputs, for example, to allow a user to define the matching rules.

In step 130, the matching engine can be programmed or otherwise configured to compare first and second location attributes of first and second contact objects, respectively, to determine a geographical distance between the first and second location attributes. An exemplary matching engine is MatchUp® offered by Melissa DATA™, although any commercially suitable software could be used.

In some contemplated embodiments, the distance between the first and second contact objects can be determined by calculating the great circle distance between the objects. The great circle distance is calculated using the spherical law of cosines, as shown in the following formula:

$$D=R*(\arccos(\sin \text{latitude}_1 * \sin \text{latitude}_2 + \cos \text{latitude}_1 * \cos \text{latitude}_2 * (\cos \text{latitude}_1 - \text{latitudte}_2))$$

where D is distance, latitude$_1$ and longitude$_1$ are the coordinates associated with a first record, latitude$_2$ and longitude$_2$ are coordinates associated with a second record, and R is the radius of the Earth, approximately 3963.16 miles (63787.1 kilometers). Of course, other distance measurements could be used without departing from the scope of the inventive subject matter described herein.

In step 140 a decision is made preferably via the matching engine whether the geographical distance between the first and second contact objects is calculated to be less than a threshold distance. If the geographical distance is less than the threshold distance, the matching engine or other component preferably automatically assigns or otherwise associates a group identification number with each of the first and second contact objects in step 150.

The threshold distance is preferably user defined prior to initiating the matching process. Contemplated threshold distances include, for example, 1 mile (1.609 kilometers), 5 mile (8.047 kilometers), 10 miles (16.09 kilometers), 15 miles (24.14 kilometers), 20 miles (32.19 kilometers), and so forth, although it is further contemplated that the user could manually input a threshold distance different from these distances.

It is contemplated that the matching engine could stop searching for additional matches to the objects assigned a group identification number once an initial match is found between those objects. However, such approach could possibly result in missed matches. For example, in example 1 below, this approach would not have matched object 3 with object 1 despite the objects being within the threshold distance.

Figure 2:
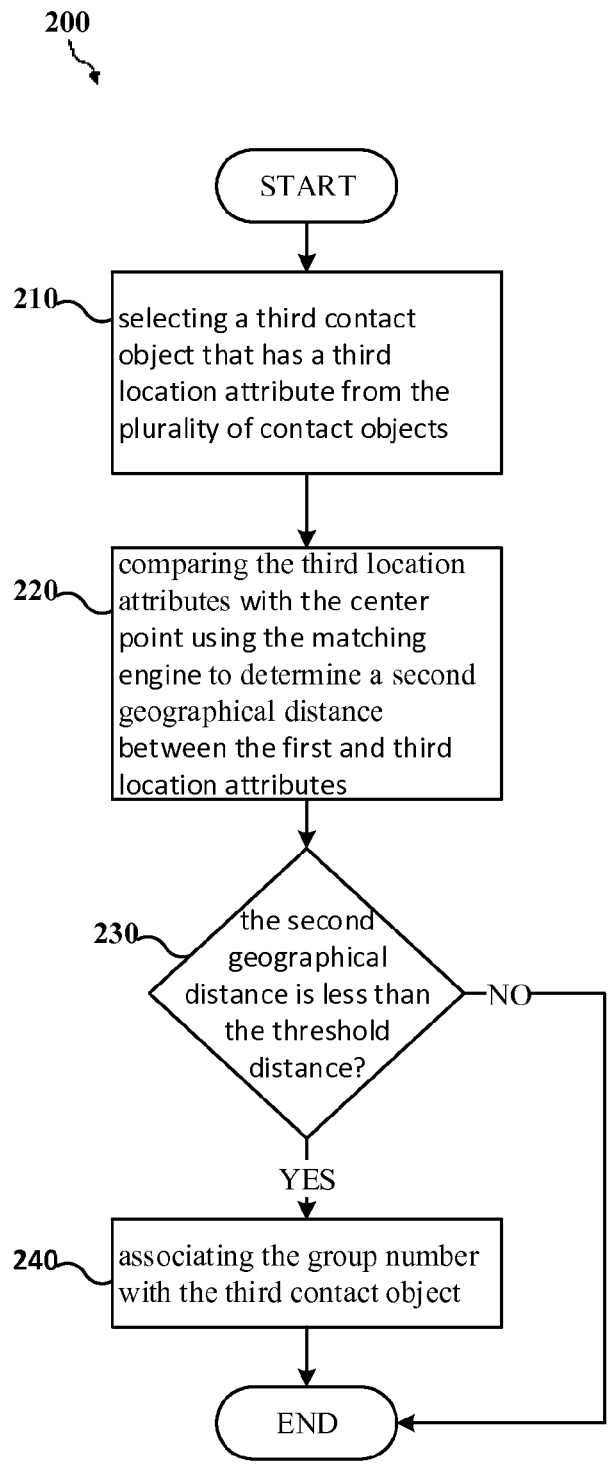
FIG. 2 is a flowchart illustrating another embodiment of a method for matching records in a database using a centroid of the contact objects of a group.

Alternatively, any additional objects found to be matching with an object of a group would also be associated with that same group identification number. For example, as shown in FIG. 2, step 210 can involve selecting a third contact object, which has a third location attribute, from the plurality of contact objects. The first and third location attributes can be compared using the matching engine in step 220 to determine a geographical distance between the first and third location attributes. In step 230, and if the geographical distance between the first and third contact objects is less than the threshold distance, then in step 240 the first group number can then be associated with the third contact object. However, such approach can result in situations where many or all of the contact objects are found to be within the threshold distance of at least one of the other contact objects within a group, and are thus all determined to be matching.

To potentially avoid this issue, it is contemplated that the threshold distance can be manually altered and used as an optimization tool of the method. Whereby the threshold distance can be set prior to a matching process based on knowledge of the geographic area covered by the plurality of contact objects and/or the number of contact objects that are being matched.

In other contemplated embodiments, all additional matching objects can be compared to the first contact object, and the distance between each of the matching contact objects and the first contact object must be less than the threshold distance for each object to match and be assigned the group identification number associated with the first object. While useful, such embodiments would likely be very sensitive to the order in which the contact objects are evaluated.

In still other contemplated embodiments, and as depicted in step 220, a centroid or center point of the contact objects having the same associated group identification number can be calculated by averaging the latitude points and the longitude points of the objects in that group. This centroid can be recalculated each time a new contact object is added/associated with the group to ensure that the centroid is accurate. To determine the average latitude and longitude values, it is contemplated that a centroid value, a total latitude value, a total longitude value, and a count of the number of objects in the group can be stored in the contact database or other location.

When a new contact object is associated with the group, the latitude and longitude attributes associated with that contact object can be added to the respective total latitude and longitude value, and the count of the number of contact objects in that group can be incremented by one. A new centroid value can then be determined by dividing each of the total latitude value and the total longitude value by the number of objects (count) value.

ity of contact objects 350A-N, where each object comprises a location attribute 360A-N. A matching engine 310 can be communicatively coupled to the contact database 330A-N, and programmed or otherwise configured to compare location attributes between a first and second contact object to determine a geographical distance between the first and second location attributes. If the geographical distance is less than a threshold distance, the matching engine 310 can associate a group number with each of the first and second contact objects.

The system 300 can further include a matching interface 320 configured to allow a user 340 to identify conditions to be used by the matching engine 310 to determine whether any given contact objects match. For example, the user 340 could specify the parameters of the objects to review, as well as the threshold distance.

EXAMPLE 1

A user desires to determine matches in a database of contact objects, which have the same first and last name and a geographical distance of less than 5 miles (8.047 kilometers). After conducting an analysis of objects sharing the same first and last names, a first duplicate group could contain the following objects:

TABLE 1

| # | First Name | Last Name | Address | City | State | Latitude | Longitude |
|---|---|---|---|---|---|---|---|
| 1. | John | Smith | 82 Salem St | Boston | MA | 42.36371 | −71.055833 |
| 2. | John | Smith | 36 High St | Boston | MA | 42.354136 | −71.055231 |
| 3. | John | Smith | 1634 Beacon St | Brookline | MA | 42.33955 | −71.135625 |
| 4. | John | Smith | 390 Needham St | Newton | MA | 42.307091 | −71.216475 |
| 5. | John | Smith | 145 Central St | Wellesley | MA | 42.300192 | −71.266785 |
| 6. | John | Smith | 9 Worcester St | Natick | MA | 42.304363 | −71.326819 |

After the plurality of records has been analyzed, each of the groups of records can be individually examined. It is contemplated that the matching engine or other component could be programmed or otherwise configured to analyze the contact objects associated with a group and delete or move duplicate objects, edit duplicate objects, merge duplicate objects, and so forth. For example, as previously discussed, certain matching rules may dictate comparing the "first name" and "last name" parameters, and whether the distance between the corresponding objects is less than a threshold distance. The matching engine or another designated component, may determine whether a match satisfying the above conditions exists between object A and object B, and will either edit object B to conform with object A, merge the attributes of object B with object A, or completely delete object B, etc. In another example, certain matching rules may dictate a match if "company name" and "area of business" parameters of two given objects match, and if the distance between the same contact objects is less than a threshold distance. In this case, if a match is determined then similarly, matching objects may be deleted, merged, or edited to eliminate duplicity within the related contact database. For example, company names could be normalized where necessary based on one or more matching rules. Such matching rules may be used to eliminate duplicate contact objects pertaining to businesses and/or other artificial entities.

Figure 3A:
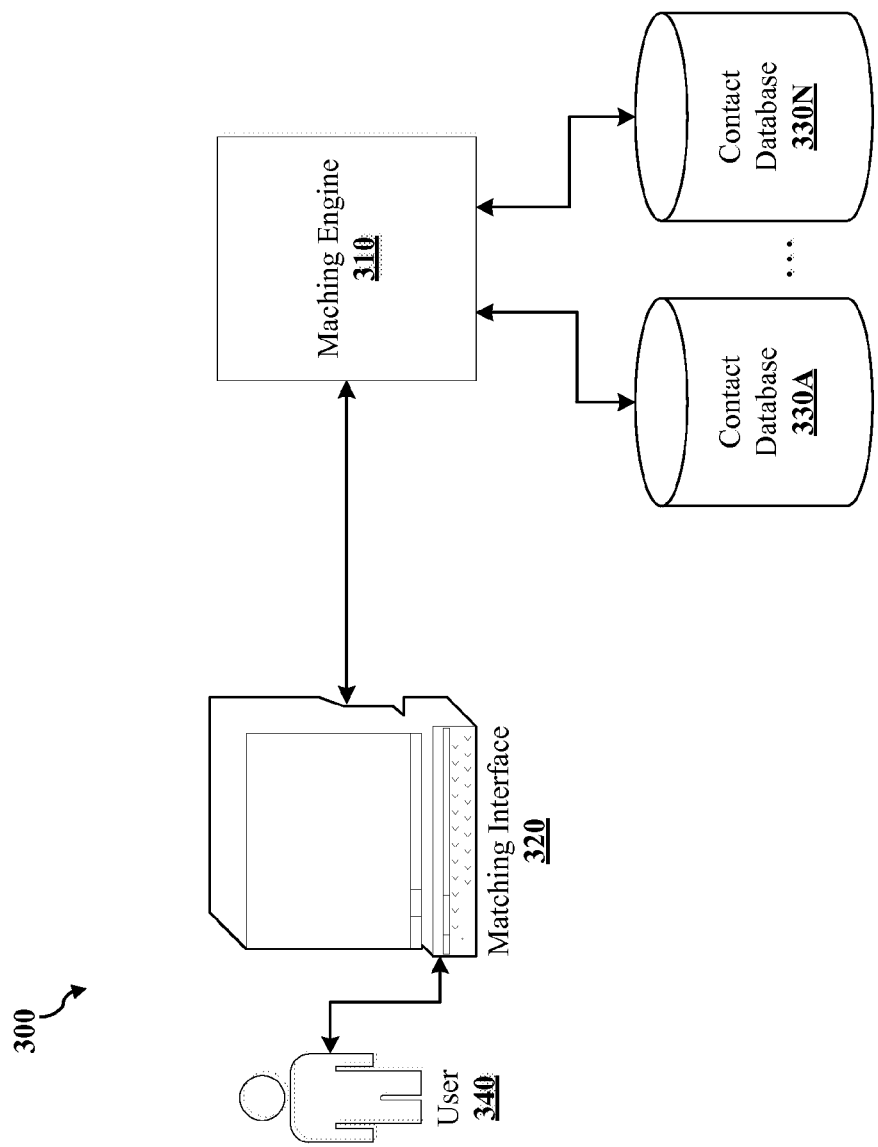
FIG. 3A is a diagram of one embodiment of a system for matching records in a database.
Figure 3B:
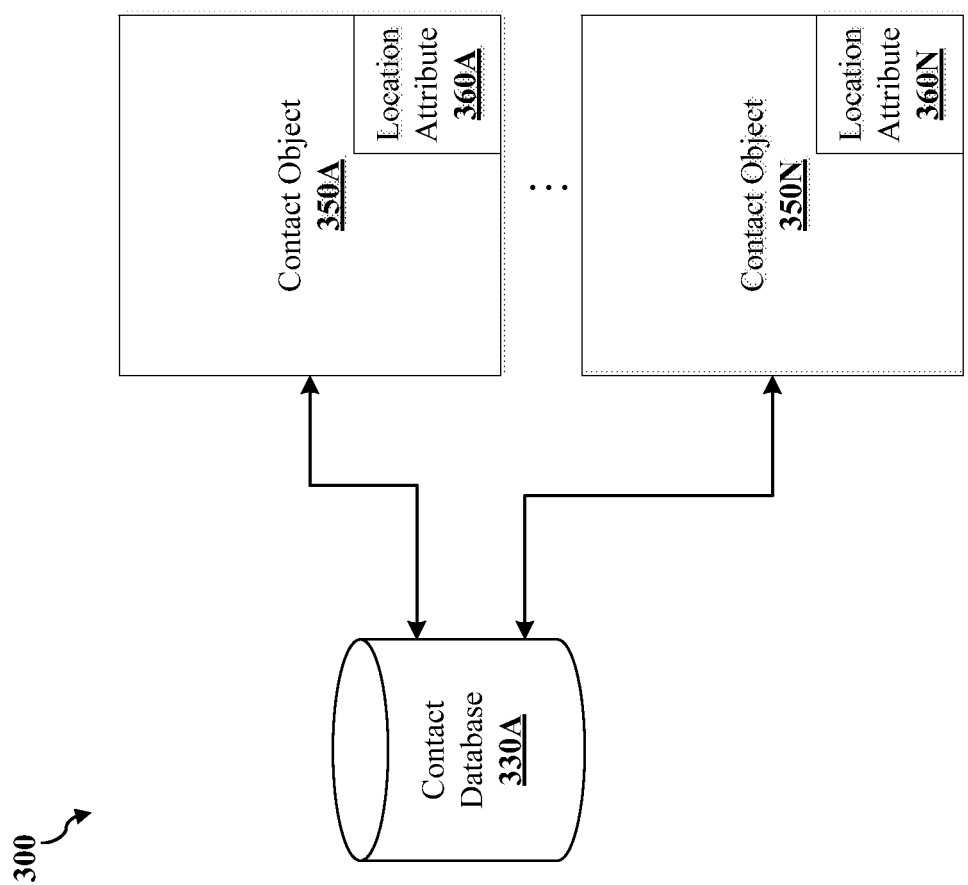
FIG. 3B is a diagram of one embodiment of a system for matching records in a database.

FIGS. 3A and 3B illustrate an embodiment of a system 300 for matching contact objects 350A-N in a database using geographical proximity. The system 300 can include one or more contact databases 330A-N configured to store a plural- Next, the latitude and longitude of the objects can be compared to determine the geographic proximity of the objects with respect to each other. For example, Objects 1 and 2 can be compared, and determined to have a geographical distance between them of 0.662 miles (1.065 kilometers). Because this distance is less than the threshold distance of 5 miles (8.047 kilometers), the objects are considered to be matching and are each associated with a first group identification number.

Objects 1 and 3 are then compared, and determined to have a geographical distance between them of 4.412 miles (7.1 kilometers). Because this distance is less than the threshold distance of 5 miles (8.047 kilometers), Object 3 considered to be matching with Object 1, and is associated with the first group identification number. Object 4 is calculated to be 9.107 miles (14.66 kilometers) from Object 1, so it does not directly match Object 1. However, when Object 4 is compared with Object 3, it is determined to be 4.708 miles (7.577 kilometers) from Object 3, and thus a match with Object 3. Object 4 is then assigned the same group identification number as Object 3, which is also the same group identification number as Objects 1 and 2. Thus, in this example, Objects 1, 2, 3 and 4 are considered matches.

Following the same algorithm, Objects 4 and 5 are calculated to have a distance of 2.621 miles (4.218 kilometers), and therefore match, and Objects 5 and 6 are calculated to have a distance of 3.089 miles (4.971 kilometers), and therefore match. Thus, in this example, all six of the objects in this set are considered to match, despite that Object 1 and Object 6 are calculated to be 14.469 miles (23.29 kilometers) apart, which is much greater than the user-specified threshold distance.

EXAMPLE 2

TABLE 2

| # | First Name | Last Name | Address | City | State | Latitude | Longitude |
|---|---|---|---|---|---|---|---|
| 7. | John | Smith | 37 Manchester Ct | Newtown | MA | 42.87456 | −71.011475 |
| 8. | John | Smith | 56 Bristol St | Newtown | MA | 42.83556 | −71.011175 |
| 9. | John | Smith | 7 Newport Cr | Newtown | MA | 42.81357 | −71.023578 |

If Object 7 of Table 2, is matched with Object 1 of Table 1, the distance between the two objects is calculated to be 35.37 miles (56.92 kilometers). Similarly, Object 8 and Object 9 are calculated to have a distance of 32.62 miles (52.49 kilometers) and 31.12 miles (50.09 kilometers) respectively, from Object 1. Thus, Object 7, Object 8, and Object 9 are not considered to be matching to Object 1, and are not associated with the first group identification number. However, since Object 7 and Object 8 are calculated to be 2.69 miles (4.34 kilometers) apart and Object 7 and Object 9 are calculated to be 4.26 miles (6.85 kilometers) apart, the objects of Table 2 meet the threshold requirement, and are associated with a second group identification number. Thus, the objects of Table 2 are matched and the same process applied above to the objects of Table 1 is employed here for the purposes of removing, editing, merging, or taking any other appropriate action to eliminate duplicity of objects.

EXAMPLE 3

Using the above six objects shown in Table 1, Object 1 and Object 2 are compared, and are found to match. Each of Objects 1 and 2 are then associated with a first group identification number. The matching engine or other component then calculates a centroid (center point) of the locations associated with Objects 1 and 2, and associates that centroid with the first group. In this example, the centroid of the first group would have coordinates [42.358923, −71.055532].

Object 3 can then be compared with the first group's centroid to determine a distance between the centroid and Object 3. Object 3 is found to be 4.313 miles (6.941 kilometers) from the first group's centroid, and is associated with the first group identification number. Because a new object was associated with the first group, the centroid of the first group is then recalculated to account for all the objects in the first group. The new centroid of the first group would have coordinates [42.352465, −71.08223].

Each of Objects 4, 5, and 6 can be individually compared with the new centroid of the first group, and are found to have a distance of 7.555 miles (12.16 kilometers), 10.118 miles (16.28 kilometers), and 12.959 miles (20.86 kilometers), respectively, which are all greater than the threshold distance.

Figure 4:
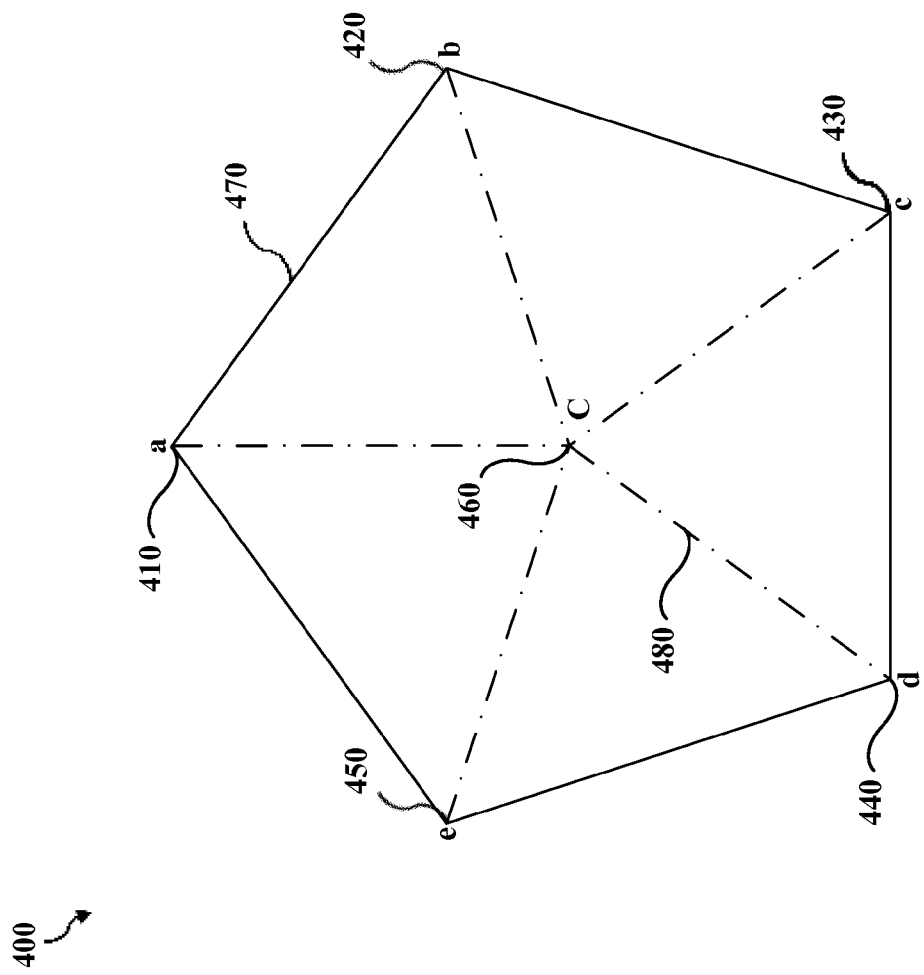
FIG. 4 is a diagram of a center point of a set of records associated with the same group identification number.

To determine a threshold distance adjustment, a group of three or more points (n) 410 420 430 440 450 can be represented by a polygon of n points. See FIG. 4. The threshold distance adjustment analysis presumes a worst-case scenario, where every point is a maximum distance from every other point of the group. This can be modeled with a regular polygon having n sides of length D 470 (the user-specified threshold distance). The center of the polygon (C) 460 also represents the points' centroid. For example, as shown in FIG. 4, for 5 points, the worst-case length for perimeter lines ab, bc, cd, de and ea is D 470. From center point C, we wish to find the radius r 480, from C to any of points a, b, c, d, or e.

Using the logic discussed above, it was determined that the user-specified threshold distance must be adjusted to compensate for each additional object added to a group. The formula for this calculation is:

$$r = D/\sin(\pi/n)$$

where r is the adjusted threshold distance and D is the user-specified distance. For n points, a point must be, at most, distance r from the centroid C, such that it is no greater than distance D from any other point. For 3 points in the above example, the adjusted threshold would be 5.77 miles (9.286 kilometers), for 4 points, 7.07 miles (11.38 kilometers), for 5 points, 8.506 miles (13.69 kilometers), and so forth.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for matching contact objects in a database using geographical proximity comprising:

providing access to at least one contact database configured to store a plurality of contact objects comprising first, second, and third contact objects, wherein the first contact object has a first geographic coordinated, the second contact object has a second geographic coordinate, and the third contact object has a third geographic coordinate;

providing access to a matching engine that is communicatively coupled to the at least one contact database;

comparing the first and second geographic coordinates using the matching engine to determine a first geographical distance between the first and second geographic coordinates;

associating a group number with each of the first and second contact objects and calculating a centroid geographic coordinate if the first geographical distance is less than a threshold distance;

determining a second geographical distance between the third geographic coordinate and the centroid geographic coordinate; and associating the group number with the third contact object if the second geographical distance is less than the threshold distance.

2. The method of claim 1, wherein the threshold distance is at least five miles.

3. The method of claim 1, wherein the threshold distance is at least ten miles.

4. The method of claim 1, further comprising deleting the first contact object.

5. The method of claim 1, further comprising merging at least a portion of the first and second contact objects.

6. The method of claim 1, wherein each of the plurality of contact objects includes a last name attribute, an address attribute, a phone number attribute, and further comprising identifying a subset of contact objects from the plurality of contact objects based on at least one of the last name attribute, the address attribute, and the phone number attribute using the matching engine, wherein the subset comprises the first and second contact objects.

7. The method of claim 1, further comprising:
   calculating a second center point between the centroid and third geographic coordinates based on an average latitude value and longitude value of the centroid and third geographic coordinates; and
   associating the second center point with the group number.

8. The method of claim 7, wherein the plurality of contact objects comprises a fourth contact object having a fourth geographic coordinate, and further comprising:
   comparing the fourth geographic coordinate with the new center point to determine a third geographical distance; and
   associating the group number with the fourth contact object if the third geographical distance is less than the threshold distance.

9. The method of claim 1, wherein the matching engine is further configured to generate a matching interface configured to present contact objects associated with the group number.

10. The method of claim 9, wherein the matching interface is further configured to allow a user to modify the threshold distance.

11. A method for matching contact objects in a database using geographical proximity comprising:
   providing access to a contact database configured to store a plurality of contact records comprising first, second, and third contact records, wherein the first contact record comprises a first name and a first geographic coordinated, the second contact record comprises a second name and a second geographic coordinate, and the third contact record comprises a third name and a third geographic coordinate;
   providing access to a matching engine that is communicatively coupled to the contact database;
   comparing the first and second geographic coordinates using the matching engine to determine a geographical distance between the first and second geographic coordinates;
   deleting the first or second contact record from the database and calculating a centroid geographic coordinate if the geographical distance is less than a threshold distance;
   deleting the third contact record from the database if a second geographical distance is less than a threshold distance, wherein the second geographical distance is the distance between the third geographic coordinate and the centroid geographic coordinate.

12. The method of claim 11, wherein the threshold distance is at least five miles.

13. The method of claim 11, further comprising deleting the first contact record.

14. The method of claim 11, further comprising merging at least a portion of the first and second contact records.

* * * * *